(12) United States Patent
Russ et al.

(10) Patent No.: US 6,321,731 B1
(45) Date of Patent: Nov. 27, 2001

(54) ENGINE CONTROL STRATEGY USING DUAL EQUAL CAM PHASING COMBINED WITH EXHAUST GAS RECIRCULATION

(75) Inventors: Stephen George Russ, Canton; Robert Albert Stein, Saline, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/488,066

(22) Filed: Jan. 19, 2000

(51) Int. Cl.$^7$ ................................................. F02M 25/07
(52) U.S. Cl. ........................................................ 123/568.14
(58) Field of Search .......................... 123/568.11, 568.12, 123/568.13, 568.14, 90.16, 321, 90.15

(56) References Cited

U.S. PATENT DOCUMENTS

| | | | |
|---|---|---|---|
| 4,109,625 | * 8/1978 | Kawamura et al. | 123/568.13 |
| 4,424,790 | * 1/1984 | Curtil | 123/568.14 |
| 5,515,832 | * 5/1996 | Bidner et al. | 123/568.14 |
| 5,682,854 | * 11/1997 | Ozawa | 123/568.14 |
| 5,960,755 | * 10/1999 | Diggs et al. | 123/568.14 |
| 6,125,801 | * 10/2000 | Mendler | 123/568.14 |
| 6,161,519 | * 12/2000 | Kimura et al. | 123/568.14 |

OTHER PUBLICATIONS

"Dual Equal VCT—A Variable Camshaft Timing Strategy for Improved Fuel Economy and Emissions", by R.A. Stein et al, SAE Technical Paper No. 950975, Feb. 27—Mar. 2, 1995, pp. 1–13.

* cited by examiner

Primary Examiner—Willis R. Wolfe
(74) Attorney, Agent, or Firm—Jerome R. Drouillard

(57) ABSTRACT

The invention comprises a strategy and method for phase shifting intake and exhaust valve timing relative to crankshaft position as a function of engine operating variables, whereby valve overlap is delayed to obtain improved fuel economy resulting from a late intake valve closing to reduce pumping work during the intake stroke. The exhaust gases are drawn into the combustion cylinder of the engine during the intake stroke, which reduces oxides of nitrogen in the exhaust gas and reduces unburned hydrocarbons. Improved thermal efficiency and reductions in oxides of nitrogen are achieved as the combustion charge is diluted at higher loads by an external exhaust gas recirculation system, thereby combining the effects of exhaust gas recirculation and dual equal variable camshaft timing to obtain fuel economy benefits that cannot be achieved with either a conventional EGR system acting alone or dual equal variable camshaft timing acting alone.

11 Claims, 5 Drawing Sheets

INTAKE

COMPRESSION

EXPANSION

EXHAUST

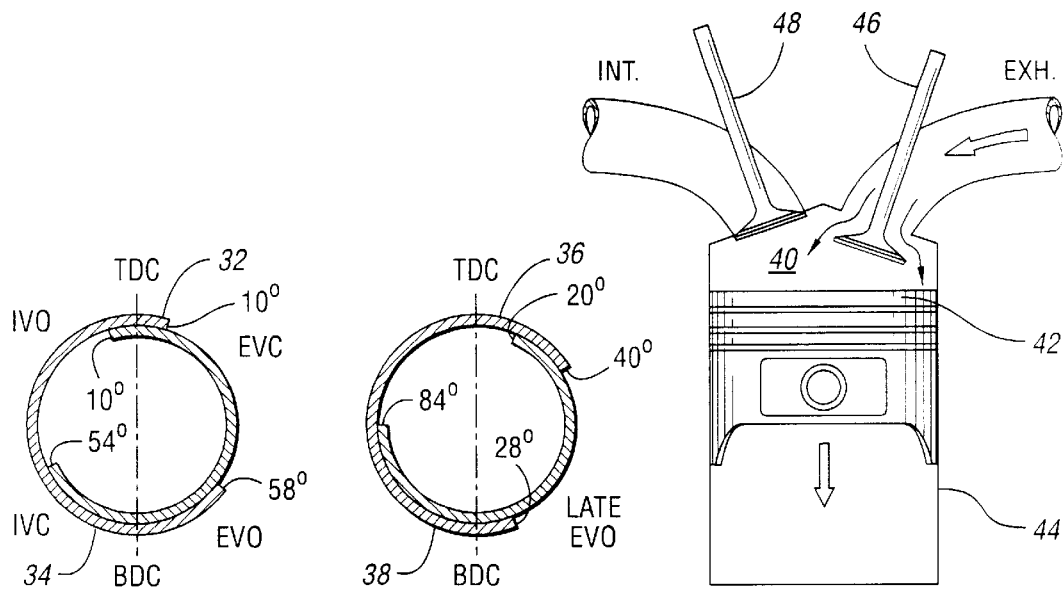
*Fig. 3a*   *Fig. 3b*   *Fig. 4a*
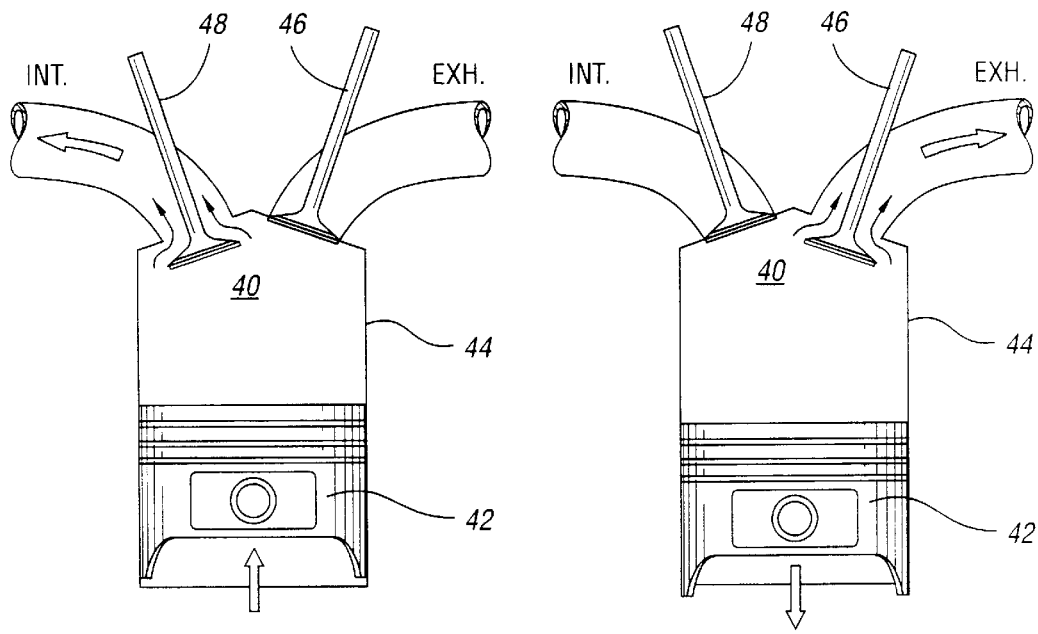
*Fig. 4b*   *Fig. 4c*

ENGINE CONTROL STRATEGY USING DUAL EQUAL CAM PHASING COMBINED WITH EXHAUST GAS RECIRCULATION

TECHNICAL FIELD

A control strategy for controlling internal combustion engines, particularly for controlling valve timing relative to crankshaft position.

BACKGROUND OF THE INVENTION

A conventional internal combustion engine, such as a four stroke cycle engine typically used in passenger vehicles, uses an exhaust gas recirculation system for reducing emissions of oxides of nitrogen. In such systems, the exhaust gas is recirculated back to the combustion chamber thus reducing peak combustion temperature. Because formation of oxides of nitrogen increases as combustion temperature increases, the presence of exhaust gas in the combustion chamber reduces oxides of nitrogen.

It is known design practice to obtain exhaust gas recirculation by altering the valve timing normally associated with a four stroke OTTO cycle internal combustion engine. Internal exhaust gas recirculation will result from the overlap in the operation of the intake valve and the operation of the exhaust valve (i.e., the intake valve is open while the exhaust valve has not yet closed). As a result, residual gases are reinducted into the cylinder along with a fresh air/fuel mixture.

The use of an internal exhaust gas recirculation system of this kind has limitations since excess overlap precludes stable engine operation at light loads, which is characterized by misfire and increases in HC emissions.

It is known design practice also to use an external EGR system, rather than an internal EGR system to meet limit values for oxides of nitrogen. Such systems return engine exhaust gas to the fresh air/fuel mixture.

A recently developed internal exhaust gas recirculation system for four stroke cycle, spark-ignition, internal combustion engines involves a dual equal variable camshaft timing strategy (DE/VCT). This strategy includes phase shifting of the intake and exhaust valve timing relative to the crankshaft position as a function of engine operating variables. This is done principally to improve fuel economy and emissions at part load, which makes it possible to eliminate the external EGR system.

The DE/VCT strategy for phase shifting the intake and exhaust events involves phase shifting equally the opening of the intake valve and the closing of the exhaust valve into the intake stroke phase of the engine combustion cycle. Likewise, the exhaust valve opening is delayed so that this event occurs closer to the bottom dead-center position of the piston, and the intake valve closing occurs farther from the bottom dead-center position due to the retarded overlap of the intake valve and exhaust valve functions.

At the beginning of the intake stroke, the DE/VCT strategy causes the intake valve to be closed while the exhaust valve is open. Exhaust gases then are drawn into the cylinder from the exhaust port during the intake stroke, which results in reduced oxides of nitrogen in the exhaust gases and reduced unburned hydrocarbons. Pumping losses associated with the intake stroke are reduced using the DE/VCT strategy because the exhaust gas drawn into the cylinder is at exhaust back pressure. As the intake valve begins to open, gases in the cylinder are expanded since flow through the exhaust port is not sufficient to maintain exhaust gas pressure. This results in higher cylinder pressure during the first part of the intake stroke, which reduces pumping work. Further, with the increased residual gas drawn into the combustion chamber, a higher manifold absolute pressure is required to maintain a given load. This higher manifold absolute pressure also results in reduced intake stroke pumping work.

Camshaft phase shifting associated with the DE/VCT strategy also causes a later intake valve closing, causing more of the fresh charge to enter the intake port during the first part of the compression stroke. This too requires a higher manifold absolute pressure to maintain a given load. The intake stroke pumping work is reduced for this additional reason.

Although a late intake valve closing has been determined to reduce pumping losses, it also reduces the effect of compression ratio and temperature near the end of the compression stroke, thus reducing burn rate and dilution capability, which limits the fuel economy benefit. This disadvantage, however, is overcome by the DE/VCT phase shifting strategy because of the higher initial temperature of the residual gas and fresh charge mixture. This higher initial temperature results from the use of internal exhaust gas recirculation rather than external exhaust gas recirculation. The disadvantage of using higher initial gas temperature, which tends to promote detonation, is offset by the reduction in effective compression ratio due to the late intake valve closing. Further, the use of a late exhaust valve opening results in increased expansion work, which results in improved efficiency (i.e., indicated specific fuel consumption).

It is has been observed that at higher speeds and loads, the use of the dual equal variable camshaft timing strategy without an external exhaust gas recirculation system results in exhaust stroke pumping losses because of the late opening of the exhaust valve. Furthermore, during the intake stroke, the low valve lift at high piston speeds, resulting from the later opening of the intake valve, increases intake stroke pumping losses.

DISCLOSURE OF INVENTION

It is an objective of the invention to combine the advantages of using dual equal variable camshaft timing for achieving exhaust gas recirculation at low and moderate engine loads with the advantages of using an external exhaust gas recirculation system at higher engine loads. In this way, the external exhaust gas recirculation system may be used only during operation at higher engine loads to improve thermal efficiency and achieve a reduction in nitrous oxide gases in the engine exhaust. Further, decreased pumping losses during the intake and exhaust strokes of the engine also result from the use of an external exhaust gas recirculation system in the high engine load range.

Using an earlier intake valve opening and a corresponding earlier exhaust valve closing produces low valve lift earlier in the intake stroke, compared to usual DE/VCT timing, when the piston speeds are less than they are when the piston approaches midposition.

A further characteristic of the improved strategy of the invention results from a reduction in the tendency of the engine to detonate without compromising fuel economy. This is achieved by retaining the later intake valve closing associated with the dual equal variable camshaft timing strategy.

The use of reduced cam retard to achieve an earlier exhaust opening and intake valve closing compared to the retard normally associated with a dual equal variable camshaft timing strategy involves measuring the engine load, advancing the timing of the opening of the intake valve and the closing of the exhaust valve into the intake stroke portion of the combustion cycle as a function of engine load, whereby both the intake valve opening event and the exhaust valve closing event occur after the instant of the top dead center position of the piston, and recirculating exhaust gas through a gas recirculation flow passage to the flow intake side of the intake valve when the engine load is in a mid-load range and higher load range thereby improving efficiency of the engine and reducing the content of oxides of nitrogen in the exhaust gases.

BRIEF DESCRIPTION OF DRAWINGS

FIG. 3a is a diagram showing the valve overlap and the valve timing for a standard engine of the kind illustrated in FIGS. 1a–1e;

FIG. 3b is a diagram corresponding to FIG. 3a but which shows the valve timing and overlap for a dual equal camshaft phase shift;

FIG. 4a is a schematic diagram of a piston and cylinder assembly with intake and exhaust valves positioned in accordance with the timing strategy for the timing diagram of FIG. 3b, where the overlap for the intake and exhaust valves is delayed during the intake stroke relative to the standard overlap of FIG. 3a;

FIG. 4b is a schematic diagram corresponding to FIG. 4a wherein the closing of the intake valve is delayed during the compression stroke relative to the standard timing of FIG. 3a;

FIG. 4c is a schematic diagram corresponding to FIG. 4a wherein the opening of the exhaust valve is delayed during the expansion stroke relative to the standard timing of FIG. 3a;

BEST MODE FOR CATTYING OUT THE INVENTION

Figure 1A:
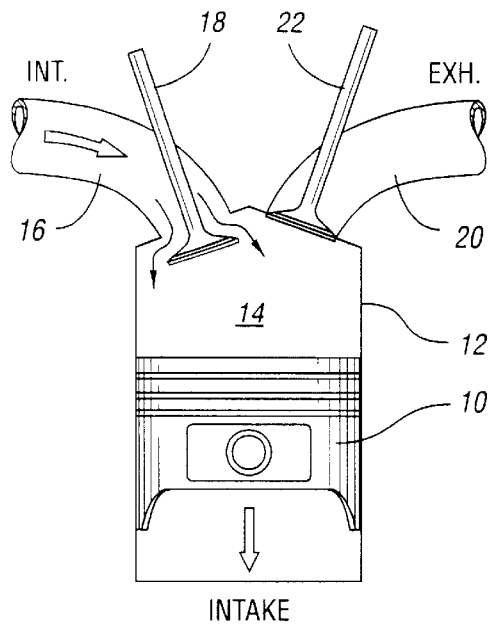
FIGS. 1a–1e are schematic representations of a conventional exhaust gas recirculation system for a four stroke cycle internal combustion engine.

FIGS. 1a, 1b, 1c, 1d and 1e show schematically a conventional four stroke cycle engine having one or more cylinders. One of the engine cylinders is illustrated in FIG. 1a in the intake mode, in FIG. 1b in the compression mode, in FIG. 1c in the expansion mode, and in FIG.1d in the exhaust mode. In FIGS. 1a–1d, piston 10 and cylinder 12 define a combustion chamber 14. The piston 10, which is connected to a crankshaft in known manner, moves downward in the cylinder 12 during the intake stroke, as shown by the directional arrow in FIG. 1a. During the intake stroke, air or an air/fuel mixture is drawn into the combustion chamber from intake passage 16. The flow is controlled by intake valve 18. An exhaust port 20 communicates with the combustion chamber 14 through an exhaust valve 22.

Figure 1B:
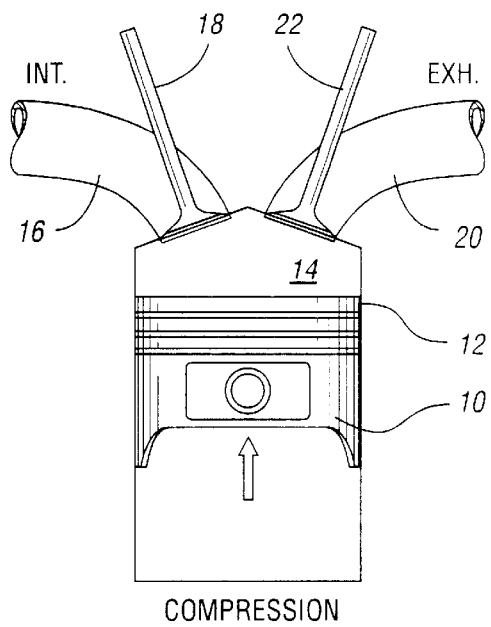
Figure 1C:
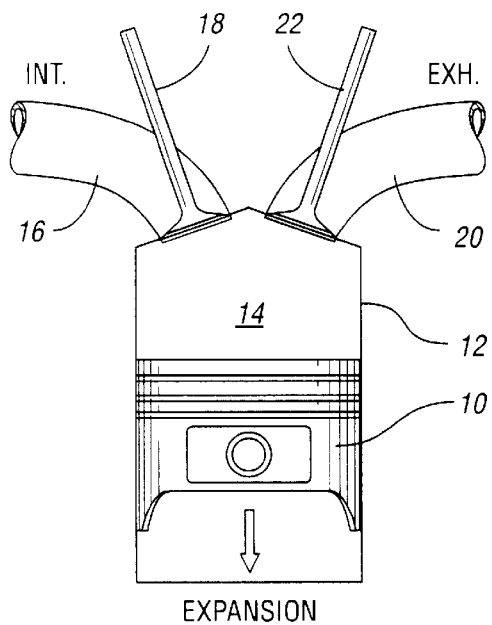
Figure 1D:
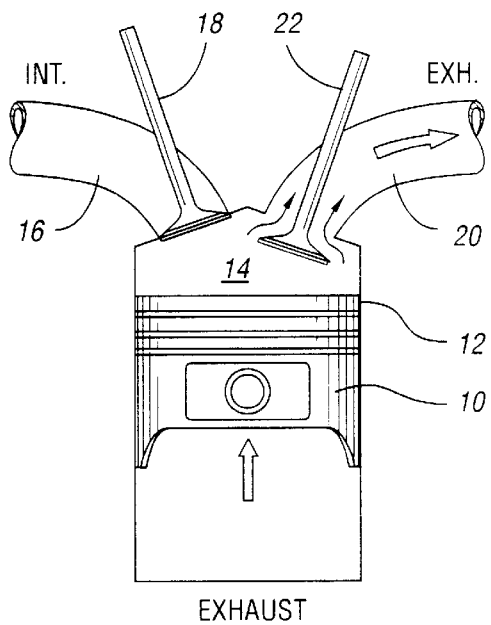

During the compression stroke, which is indicated in FIG. 1b, the piston moves upward, thereby compressing the charge in combustion chamber 14. At that time, the intake valve 18 and the exhaust valve 22 are closed, as shown. During the expansion stroke, the combustible charge in the combustion chamber 14 burns, which drives the piston 10 downward, as shown in FIG.1c. Intake and exhaust valves are closed during the expansion stroke. During the exhaust stroke, shown in FIG.1d, the piston 10 moves upwardly to drive the exhaust gases through the open exhaust valve 22 into the exhaust port 20.

Figure 2:
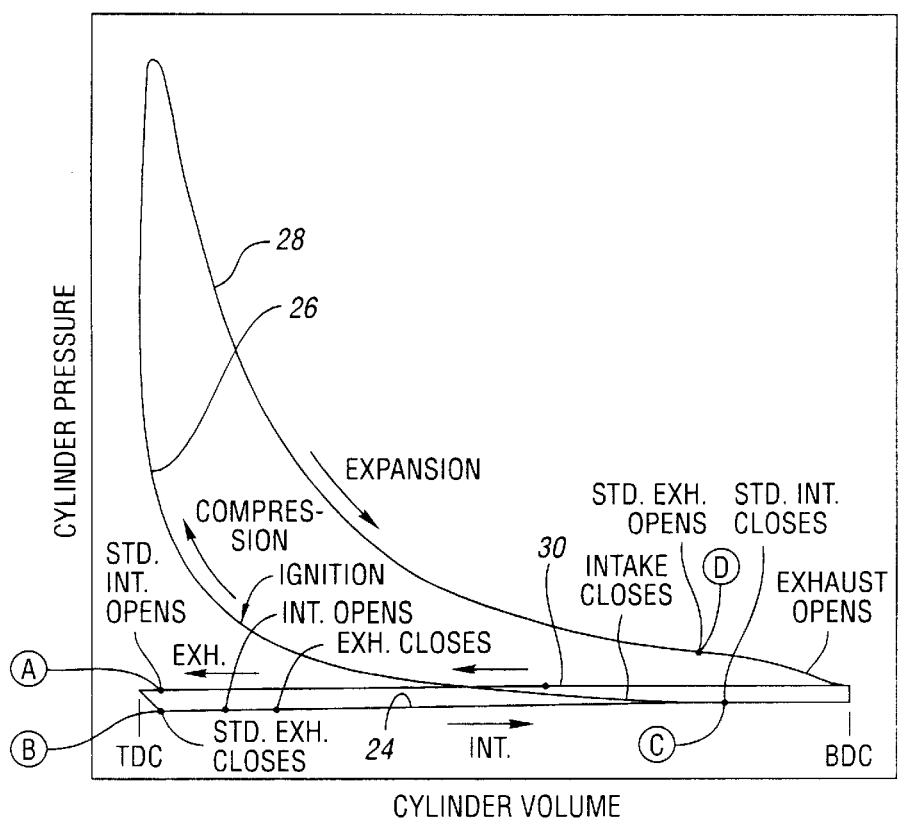
FIG. 2 is a cylinder volume and cylinder pressure plot for the four stroke cycle engine schematically illustrated in FIGS. 1a–1e, but which also illustrates a comparison between the timing of a standard valve operating strategy with the improved valve operating strategy of the invention.

Shown in FIG. 2 is a conventional pressure-volume diagram. As the piston moves through the four stroke combustion cycle, the cylinder pressure variations are indicated.

During the intake stroke shown at 24, gases are drawn into the combustion chamber through the intake port. When the piston reaches the bottom dead-center position shown in FIG. 2, the piston begins the compression stroke shown at 26. The charge is compressed and then ignited during the compression stroke, as indicated.

During combustion, the cylinder pressure rises to a peak approximately at the top dead-center position, at which time the expansion stroke is begun, as shown at 28. Following the expansion stroke, the exhaust valve opens and the exhaust stroke begins, as shown at 30.

In the conventional four stroke cycle indicated in FIG. 2, the intake valve opens approximately at point A and the exhaust valve closes approximately at point B. The intake stroke continues until the bottom dead-center position (BDC) is reached. The intake valve closes near the beginning of the compression stroke, as shown at point C. The exhaust valve opens approximately at point D during the latter stages of the expansion stroke.

The foregoing description of a conventional engine, seen in FIGS. 1a–1e and 2, is made for the purpose of comparing the valve timing that will be described subsequently for the improved phase shifting of the present invention.

As previously indicated, the present invention combines features of dual equal camshaft phase shifting and internal exhaust gas recirculation with the advantages of a modified phase shifting strategy in which an external exhaust gas recirculation system is used only at high loads in accordance with the teachings of the present invention. The dual equal camshaft phase shifting of FIGS. 3b, 4a, 4b and 4c will be described for the purpose of illustrating the improved camshaft phase shifting strategy of the invention.

A standard engine without dual equal camshaft phase shifting has a valve timing diagram as seen in FIG. 3a. FIG. 3a shows an overlap at 32 between the intake valve opening event and the exhaust valve closing event. It is indicated in FIG. 3a that the intake valve opens at 10° before top dead-center (TDC) and that the exhaust valve closes at 10° after top dead-center (TDC). The other valve events are shown at 34 for the exhaust valve opening (EVO) and the intake valve closing (IVC). As seen in FIG. 3a, the exhaust valve opens about 58° before bottom dead-center (BDC) and the intake valve closes at approximately 54° after bottom dead-center.

When the dual equal camshaft phase shifting strategy is implemented, the overlap at 32 is retarded into the intake stroke as shown in FIG. 3b. This overlap is indicated at 36 in FIG. 3b. The valve event corresponding to that shown at 34 in FIG. 3a is shown in FIG. 3b at 38. The intake valve opens, as indicated in FIG. 3b, approximately 20° after top dead-center and the exhaust valve closes approximately 40° after top dead-center. Thus, the valve overlap at 36 has been shifted 30° to provide a delayed overlap.

In FIG. 3b, the other valve events at 38 have been delayed so that the exhaust valve opens at 28° before bottom dead-center rather than at 58° before bottom dead-center. Again, there has been a shift of 30° in the valve events. The intake valve closes at about 84° past bottom dead-center, rather than at 54° past bottom dead-center in the standard timing diagram of FIG. 3a. Because of this delayed overlap in the valve timing seen in FIG. 3b, exhaust gases are drawn into the combustion chamber 40, seen in FIG. 4a, as the piston 42 is stroked downward in the cylinder 44. Exhaust gases pass through the exhaust valve 46 while the intake valve 48 is still closed.

During the compression stroke, which is indicated in FIG. 4b, the fresh charge passes the intake valve because of the delay in the intake valve closing. The delayed closing of the intake valve makes it necessary to advance the throttle to obtain a higher manifold absolute pressure for any given load. This reduces the compression stroke pumping work.

During the expansion stroke shown in FIG. 4c, expansion work is increased because of the delayed opening of the exhaust valve (e.g., 28°) before bottom dead-center. Exhaust gases pass the exhaust valve 46, as indicated in FIG. 4c, much closer to the bottom dead-center position as the exhaust valve 46 opens.

In addition to reducing the intake stroke pumping work because of the delayed overlap, the nitrous oxide content of exhaust gases is reduced by the internal EGR. Furthermore, the hydrocarbon content of the exhaust gases is reduced because unburned hydrocarbons in the exhaust gases re-enter the combustion chamber through the exhaust valve as the exhaust valve closing is delayed.

The increased expansion work performed during the expansion stroke, described with reference to FIG. 4c, also reduces the hydrocarbon content of the exhaust gases because of the additional oxidation that occurs during the expansion stroke.

Figure 5:
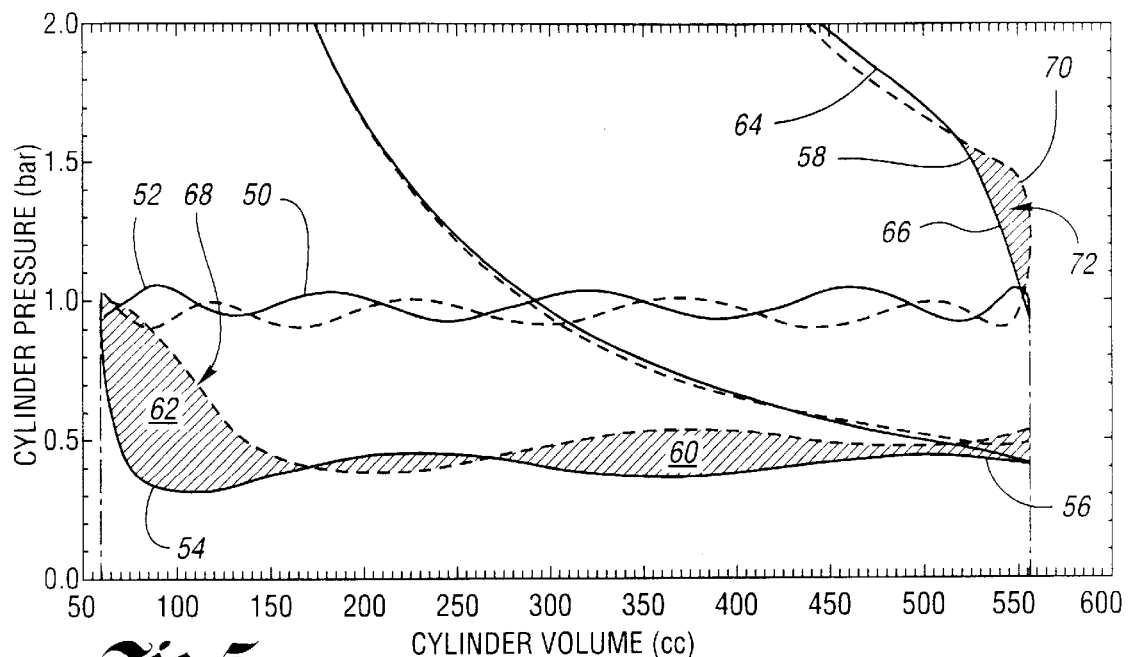
FIG. 5 is a cylinder volume and cylinder pressure plot of the kind shown in FIG. 2, but which illustrates the pressure and volume relationship for an engine having dual equal camshaft phase shifting.

FIG. 5 shows a pressure-volume comparison of an engine with DE/VCT volume timing with standard valve timing. a conventional engine, the cylinder pressure is indicated at 50. During the exhaust stroke, the intake valve opens at 52 and the exhaust valve closes at 54 during the intake stroke.

During the combustion stroke for a standard engine, the intake valve closes at 56 and the exhaust valve opens during the expansion stroke at point 58.

During the expansion stroke indicated at 64 in FIG. 5, the opening of the exhaust valve at point 58 results in a downward trend for the cylinder pressure plot. This is indicated at 66. Thus, as the piston approaches the bottom dead center position, less work is recovered from the expansion gases than would be the case if the slope of the expansion plot were to be delayed.

Superimposed on the plot of FIG. 5 is a pressure volume plot showing in dotted lines the improvement resulting from DE/VCT valve timing.

As indicated in FIG. 5 at 68, the intake valve opens later in the intake stroke than in the case of the standard camshaft timing shown in full lines. This results in a reduction in pumping work as shown at 62 in FIG. 5. Initially, the pressure of the exhaust gas drawn into the combustion chamber is at exhaust back pressure. As the intake valve begins to open, some back flow into the intake port occurs, and the gases in the cylinder are expanded since flow through the exhaust port is not sufficient to maintain exhaust back pressure. This results in higher cylinder pressure to provide an improved pressure at 62 in FIG. 5.

The closing of the intake valve using the delayed overlap strategy occurs substantially after the bottom dead center position, as indicated at point 68 in FIG. 5.

During the compression stroke, the fresh charge passes the intake valve because of the delay in the intake valve closing. This makes it necessary to advance the throttle to obtain a higher manifold pressure. This reduces pumping work as shown at 60.

The delayed exhaust valve opening, which occurs at point 70 in FIG. 5, allows the combustion gases to exert more work on the piston over a longer time thereby increasing the net work, as indicated by the shaded area 72.

Figure 1E:
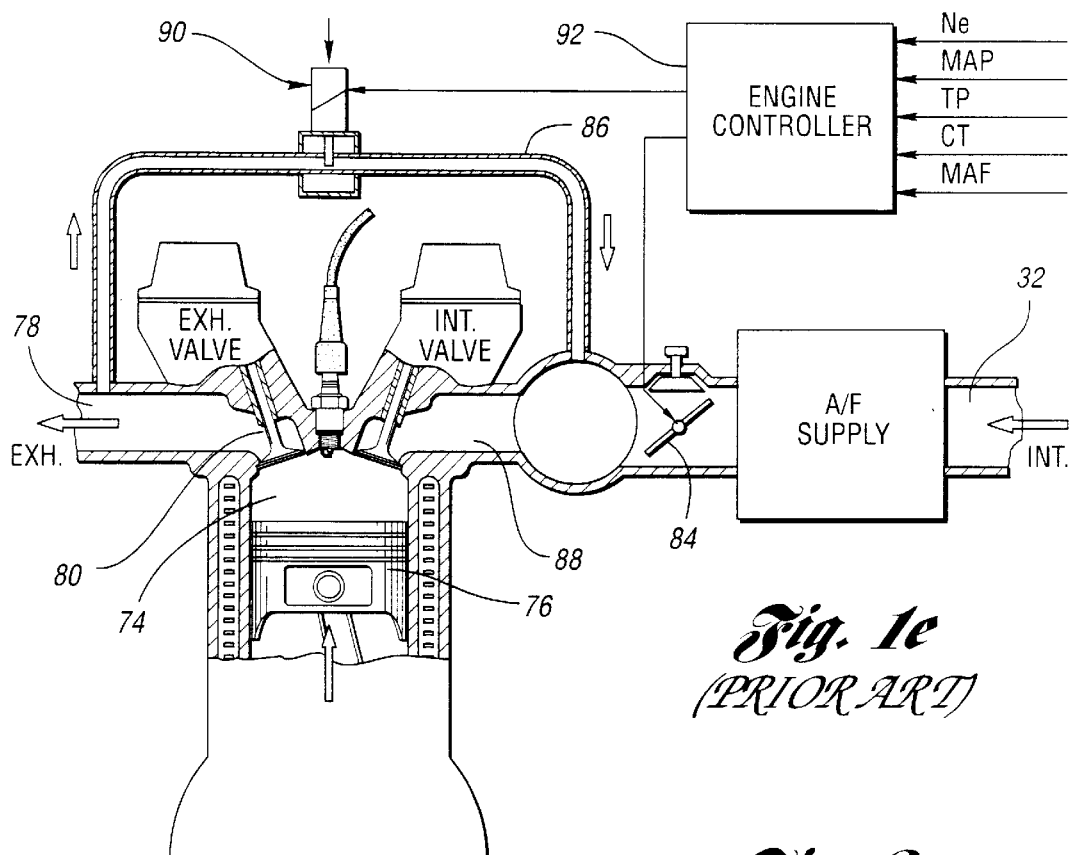

An external exhaust gas recirculation system that is used with the improved dual equal camshaft phase shifting is illustrated in FIG. 1e. A combustion chamber of conventional design is shown at 74 in FIG. 1e. As the piston 76 in FIG. 1e is stroked upward during the exhaust stroke, exhaust gases are discharged into the exhaust port 78 past exhaust valve 80. The intake port 82 develops air/fuel mixture, which is controlled by adjustable throttle valve 84.

An exhaust gas recirculation circuit includes EGR flow passage 86, which extends from the intake port 88 to the exhaust port 78. Flow through the EGR passage 86 is controlled by EGR valve 90.

An engine controller of conventional design is shown at 92. It receives engine operating variables, including engine speed, throttle position, manifold absolute pressure, mass air flow, etc., as indicated in FIG.1e, to control the opening and the closing of the EGR valve 90 and to control the position of the throttle 84.

In practicing the improved strategy of the invention, the EGR valve 90 is opened to provide external EGR dilution at high engine loads and speeds. This increases the dilution with a limited cam retard compared to the cam retard described with reference to FIG. 3b. This results in improved thermal efficiency of the engine and reduces the percentage of oxides of nitrogen in the exhaust during high load operation of the engine.

Figure 6:
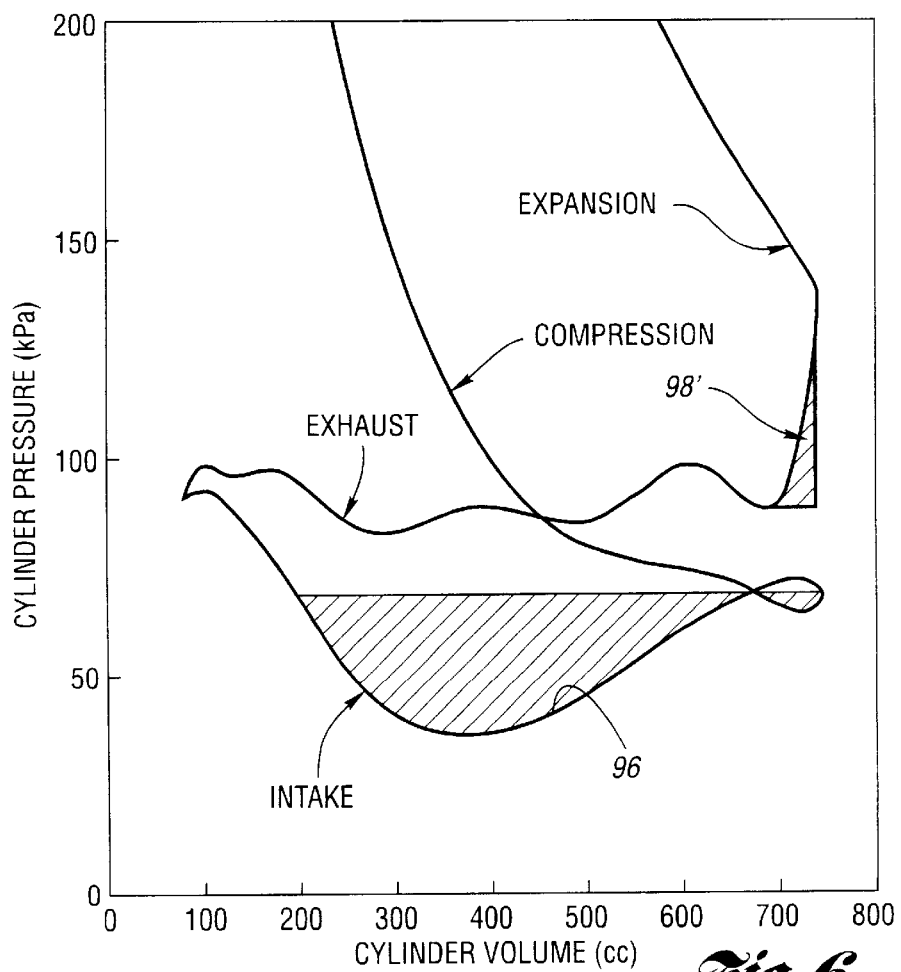
FIG. 6 is a plot that shows the cylinder volume and cylinder pressure plot for an engine operating at intermediate load at 1500 rpm in which the engine timing is set to achieve a 46° retard relative to top dead-center.
Figure 7:
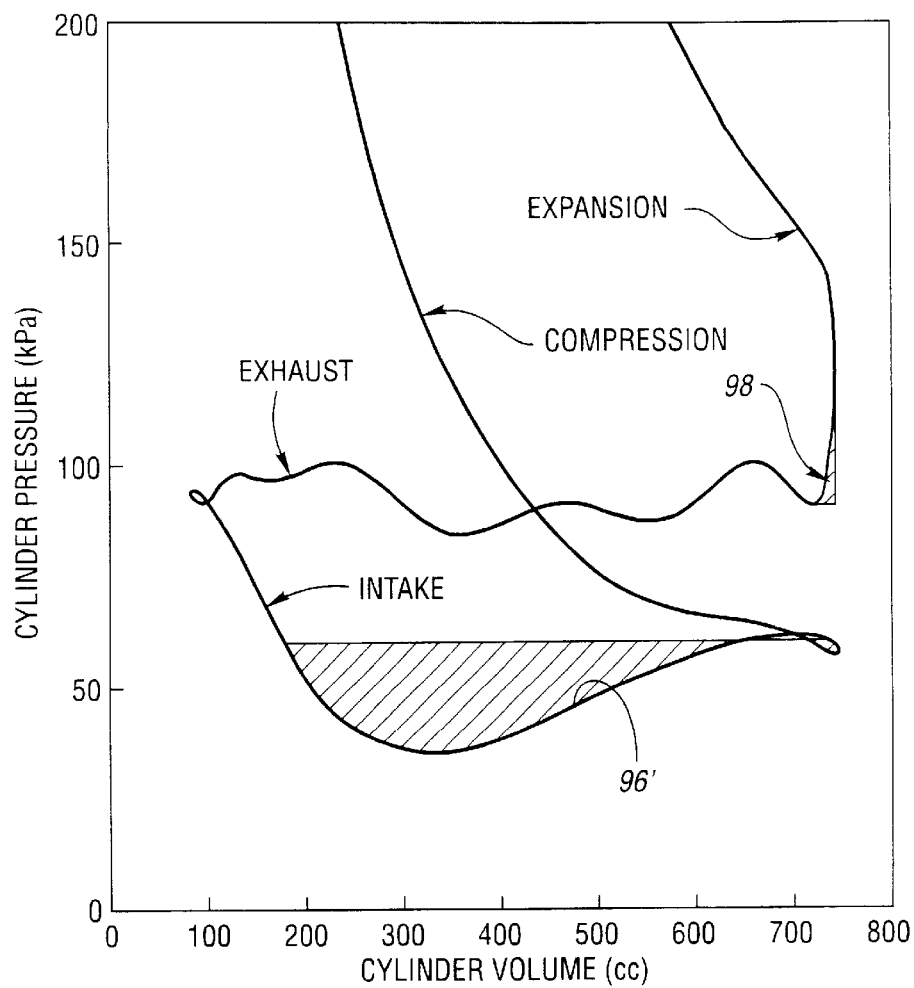
FIG. 7 is a plot of cylinder volume versus cylinder pressure corresponding to the plot of FIG. wherein the retard of exhaust valve closing is 36°.
Figure 8:
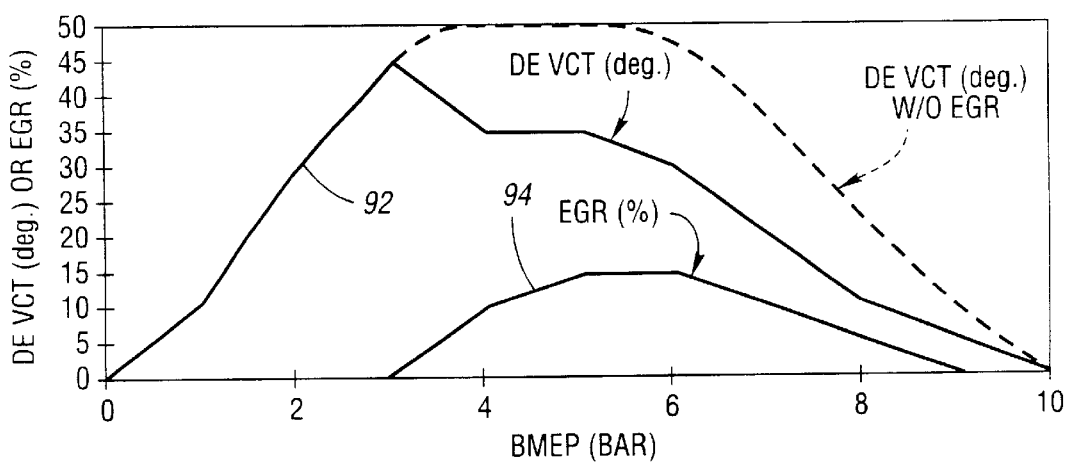
FIG. 8 is a plot of the relationships of valve overlap delay for DE/VCT timing and percentage of EGR versus combustion chamber brake mean effective pressure (engine load).

The relationship between the degree of retard of the valve timing and the brake mean effective pressure or load is indicated in FIG. 8 at 92. When the throttle 84 is advanced to a mid-setting (for example, 30–40% of wide open throttle), the EGR valve 90 is activated, thereby introducing an external EGR flow to the intake manifold to dilute the intake charge. This is shown at 94 in FIG. 8. In addition to improving the thermal efficiency and reducing the percentage of oxides of nitrogen in the exhaust, the introduction of exhaust gases through the external EGR circuit increases the intake manifold pressure, thereby decreasing the pumping work. This feature is demonstrated in FIGS. 6 and 7. In the plot of FIG. 6, a dip in cylinder pressure occurs at 96 during the intake stroke for an engine having a 46% retard in the valve overlap when the brake mean effective pressure is 2.62 bar. That pressure is equivalent to pressure at the mid-load range when the engine is operating at 1500 rpm, which is a mid-speed range.

The plot of FIG. 6 represents the performance of an engine using the dual equal camshaft phase shifting without the external EGR circuit. FIG. 7 shows the same plot for the same engine, but with the valve overlap retard at 36° rather than 46°, and with external EGR circuit available for activation at higher engine loads. The plot of FIG. 7 shows a significantly reduced dip at 96'.

Because of the later opening of the exhaust valve using the improved camshaft phase shifting strategy of the invention, less work loss occurs during the expansion stroke, as shown at area 98 in FIG. 7. In contrast to the work loss shown at 98 in FIG. 7, the corresponding work loss at 98' during the expansion stroke indicated in FIG. 6 is much larger.

Although a preferred embodiment of the strategy of the present invention has been described, it will be apparent to persons skilled in the art that modifications may be made without departing from the scope of the invention. All such modifications and equivalents thereof are included within the scope of the following claims.

What is claimed is:

1. A method for phase shifting the valve timing of an internal combustion engine with a four-stroke combustion cycle, an air/fuel combustion chamber, an intake valve, an external air exhaust gas recirculation flow passage, an exhaust valve in the combustion chamber, and a camshaft having valve operating cams for opening and closing the intake and exhaust valves during a four-stroke combustion cycle, the method comprising the steps of:

advancing the timing of the opening of the intake valve and the closing of the exhaust valve as a function of engine load whereby the opening event of the intake valve and the closing of the exhaust valve occur after the instant of the top dead center position of the piston;

providing sufficient overlap in the opening event for the intake valve and the closing event for the exhaust valve to effect internal exhaust gas recirculation in the combustion chamber during the engine intake stroke whereby the internal exhaust gas recirculation is added to the exhaust gases recirculated through the external exhaust gas recirculation flow passage; and initiating external exhaust gas recirculation when the engine load is in the range of 25% to 45% of maximum engine load.

2. A method for phase shifting the valve timing of a multiple-cylinder internal combustion engine, each cylinder having a working piston defining with the cylinder a combustion chamber, an intake valve and an exhaust valve in the combustion chamber, an external exhaust gas recirculation flow passage, and a camshaft having valve operating cams for opening and closing the intake and exhaust valves during a four-stroke combustion cycle, the method comprising the steps of:

measuring engine load, and advancing the timing of the opening of the intake valve and the closing of the exhaust valve into the intake stroke portion of the combustion cycle as a function of engine load whereby both the intake valve opening event and the exhaust valve closing event occur after the instant of the top dead center position of the piston;

recirculating exhaust through the gases from the combustion chamber exhaust gas recirculation flow passage and through the exhaust valve to the flow intake side of the intake valve when the engine load is in a mid-load range thereby improving thermal efficiency of the engine and reducing the content of oxides of nitrogen in the exhaust gases.

3. The method set forth in claim 1 wherein the step of recirculating exhaust gases is initiated when the load on the engine is 25% to 45% of the maximum engine load.

4. The method set forth in claim 1 wherein the exhaust valve is closed in the range of 35° to 55° after the instant of the top dead center position of the piston.

5. The method set forth in claim 4 wherein the intake valve is opened in the range of 25° to 50° after the instant of the top dead center position of the piston.

6. The method set forth in claim 1 wherein the steps of phasing the intake valve opening event and the exhaust valve closing event includes overlapping the two events; and advancing the timing of the opening of the exhaust valve and the closing of the intake valve whereby the exhaust valve opening event and the intake valve closing event are overlapped with a major portion of the overlap of the exhaust valve opening event and the intake valve closing event occurring after the instant of the bottom dead center position of the piston.

7. The method set forth in claim 6 wherein the step of recirculating exhaust gases is initiated when the load on the engine is 25% to 45% of the maximum engine load.

8. The method set forth in claim 6 wherein the phasing of the intake valve opening past the instant of the top dead center position of the piston is equal to the delay of the intake valve closing past the instant of the bottom dead center position of the piston.

9. The method set forth in claim 8 wherein the recirculating exhaust gases is initiated when the load on the engine is 25% to 45% of the maximum engine load.

10. The method set forth in claim 8 wherein the advance of the exhaust valve opening before the instant of the bottom dead center position of the piston is equal to the delay of the exhaust valve closing past the instant of the top dead center position of the piston.

11. The method set forth in claim 10 wherein the step of recirculating exhaust gases is initiated when the load on the engine is 25% to 45% of the maximum engine load.

* * * * *